(12) United States Patent
Ferreira Moreno et al.

(10) Patent No.: US 12,327,171 B2
(45) Date of Patent: Jun. 10, 2025

(54) DATA PLATFORM TO PROTECT SECURITY OF DATA

(71) Applicant: International Business Machines Corporation, Armonk, NY (US)

(72) Inventors: Marcio Ferreira Moreno, Copacabana (BR); Lucas Correia Villa Real, Sao Paulo (BR); Renato Fontoura de Gusmao Cerqueira, Barra da Tijuca (BR)

(73) Assignee: International Business Machines Corporation, Armonk, NY (US)

( * ) Notice: Subject to any disclaimer, the term of this patent is extended or adjusted under 35 U.S.C. 154(b) by 1485 days.

(21) Appl. No.: 15/995,367

(22) Filed: Jun. 1, 2018

(65) Prior Publication Data
US 2019/0370634 A1 Dec. 5, 2019

(51) Int. Cl.
| | |
|---|---|
| G06N 3/045 | (2023.01) |
| G06F 9/50 | (2006.01) |
| G06N 3/08 | (2023.01) |
| G06N 20/00 | (2019.01) |
| H04L 9/06 | (2006.01) |
| H04L 9/32 | (2006.01) |

(52) U.S. Cl.
CPC .......... *G06N 3/045* (2023.01); *G06F 9/5072* (2013.01); *G06N 3/08* (2013.01); *G06N 20/00* (2019.01); *H04L 9/3239* (2013.01); *H04L 9/0637* (2013.01)

(58) Field of Classification Search
None
See application file for complete search history.

(56) References Cited

U.S. PATENT DOCUMENTS

| | | |
|---|---|---|
| 6,535,469 B1 | 3/2003 | Heylen |
| 2011/0145593 A1 | 6/2011 | Auradkar et al. |

(Continued)

OTHER PUBLICATIONS

Systems and Internet Infrastructure Security (SIIS), "Data Provenance", siis.cse.psu.edu/provenance.html, Accessed on May 25, 2018, 1 page.

(Continued)

*Primary Examiner* — Chat C Do
*Assistant Examiner* — William C Wood
(74) *Attorney, Agent, or Firm* — Scully, Scott, Murphy & Presser. P.C.; Michael A. Petrocelli, Esq.

(57) ABSTRACT

A plurality of datasets may be received. Multiple instances of a machine learning algorithm may be run to create corresponding multiple machine learning models trained for a specific task in a given domain. Each of the multiple instances may use a different subset of the plurality of datasets in training the corresponding machine learning model. The multiple machine learning models may be run with input data. The multiple machine learning models produce corresponding multiple outcomes. A candidate machine learning model may be determined based on comparing each of the multiple outcomes with ground-truth output. A value associated with the different subset of the plurality of datasets may be determined based on comparing of each of the multiple outcomes with ground-truth output. A smart contract may be created which may include the value and the different subset of the plurality of datasets. The smart contract may be recorded in a blockchain.

17 Claims, 5 Drawing Sheets

(56) References Cited

U.S. PATENT DOCUMENTS

| | | | |
|---|---|---|---|
| 2013/0117608 A1* | 5/2013 | Kirby | G01W 1/10 |
| | | | 714/E11.02 |
| 2014/0095680 A1* | 4/2014 | Addison | G06F 9/5027 |
| | | | 709/222 |
| 2015/0379510 A1* | 12/2015 | Smith | G06Q 20/3829 |
| | | | 705/71 |
| 2016/0358099 A1* | 12/2016 | Sturlaugson | G06N 5/043 |
| 2017/0103167 A1 | 4/2017 | Shah | |
| 2017/0221032 A1 | 8/2017 | Mazed | |
| 2018/0018590 A1 | 1/2018 | Szeto et al. | |
| 2019/0102694 A1* | 4/2019 | Yates | G06N 5/04 |
| 2019/0155905 A1* | 5/2019 | Bachrach | G06N 3/045 |
| 2019/0156247 A1* | 5/2019 | Faulhaber, Jr. | G06N 3/0454 |
| 2019/0188566 A1* | 6/2019 | Schuster | G06N 3/08 |
| 2019/0236562 A1* | 8/2019 | Padmanabhan | H04L 63/00 |

OTHER PUBLICATIONS

Moreau, L., et al.,"The Provenance of Electronic Data", Oct. 10, 2006, http://citeseerx.ist.psu.edu/viewdoc/summary?doi=10.1.1.373.2432, Accessed on May 25, 2018, 10 pages.

Groth, P.T., et al., "Recording Process Documentation for Provenance", https://core.ac.uk/download/pdf/1509434.pdf, Accessed on May 25, 2018, 14 pages.

"Vellido, A., et al., "Making machine learning models interpretable", ESANN 2012 Proceedings, European Symposium on Artificial Neural Networks, Computational Intelligence and Machine Learning", Apr. 25-27, 2012, https://www.elen.ucl.ac.be/Proceedings/esann/esannpdf/es2012-7.pdf, Accessed on May 25, 2018, pp. 163-172.

Ethereum, "Ethereum: Build unstoppable applications", https://www.ethereum.org, Accessed on May 25, 2018, 10 pages.

* cited by examiner

DATA PLATFORM TO PROTECT SECURITY OF DATA

FIELD

The present application relates generally to computers and computer applications, and more particularly to a platform to manage and protect data used by machine learning.

BACKGROUND

The volume of data available worldwide grows exponentially. However, many actors such as companies, researchers, and common users, do not have the volume, quality and variety of data necessary to build, train and run their own machine learning models. A joint system or network may be created, for example, between a party (or a set of parties) that builds and/or uses machine learning models, and another (or set of others) that owns and/or maintains the data used for building such machine learning models. A problem that may occur in such a system is the ability to maintain confidentiality or security of data in sharing the data, such that valuable secrets are not exposed, for example, guaranteeing sensible data anonymization.

Different owners of data may contribute with different sets of data, for example, different volume, quality, and variety, in which some sets of data may have more relevance than others to different machine learning models. In this context, another problem is determining which data set contributed more to the accuracy of the machine learning model. For instance, if a data set contributed to building a particular machine learning model most accurately, that data set should be tagged or recognized as most relevant. Conversely, if a data set did not contribute to building of an accurate machine learning model, that data set should be recognized as needing improvements.

Currently, there is a lack of mechanisms to protect the confidentiality of the data that are computationally processed by third parties while correctly assigning value of the data used to build, train, or run machine learning models.

BRIEF SUMMARY

A computer-implemented method and system may be provided for protecting security of data used by a machine learning algorithm. A method, in one aspect, may include receiving a plurality of datasets, a dataset in the plurality of datasets associated with a data provider. The method may also include running multiple instances of a machine learning algorithm to create corresponding multiple machine learning models trained for a specific task in a given domain. Each of the multiple instances may use a different subset of the plurality of datasets in training the corresponding machine learning model. The method may also include running the multiple machine learning models with input data, wherein the multiple machine learning models produce corresponding multiple outcomes. The method may also include determining a candidate machine learning model from the multiple machine learning models based on comparing each of the multiple outcomes with ground-truth output. The method may also include determining a value associated with the different subset of the plurality of datasets based on the comparing of each of the multiple outcomes with ground-truth output. The method may also include creating a smart contract comprising the value and the different subset of the plurality of datasets. The method may also include recording the smart contract in a blockchain.

A system, in one aspect, may include at least one hardware processor coupled with a memory device. The at least one hardware processor may be operable to receive a plurality of datasets, a dataset in the plurality of datasets associated with a data provider. The at least one hardware processor may be further operable to run multiple instances of a machine learning algorithm to create corresponding multiple machine learning models trained for a specific task in a given domain, each of the multiple instances using a different subset of the plurality of datasets in training the corresponding machine learning model. The at least one hardware processor may be further operable to run the multiple machine learning models with input data, wherein the multiple machine learning models produce corresponding multiple outcomes. The at least one hardware processor may be further operable to determine a candidate machine learning model from the multiple machine learning models based on comparing each of the multiple outcomes with ground-truth output. The at least one hardware processor may be further operable to determine a value associated with the different subset of the plurality of datasets based on the comparing of each of the multiple outcomes with ground-truth output. The at least one hardware processor may be further operable to create a smart contract comprising the value and the different subset of the plurality of datasets. The at least one hardware processor may be further operable to record the smart contract in a blockchain.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
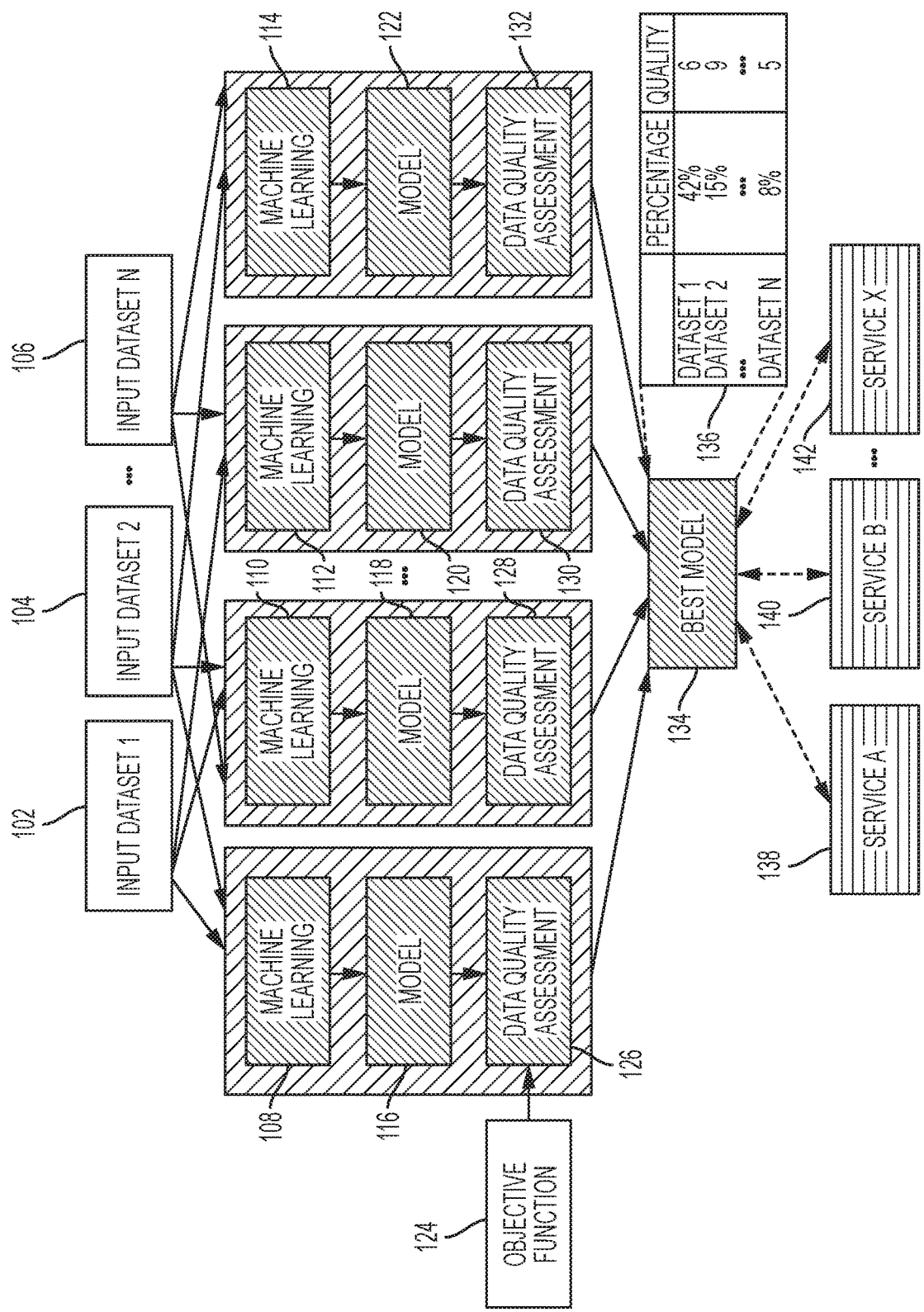
FIG. 1 is a diagram illustrating an overview of a data platform that supports creation of machine learning models in one embodiment.

Systems, methods and techniques in some embodiments may identify which source of data or which data set contributed the most for a given machine learning outcome, for example, which data set contributed most to improving the accuracy and performance of a machine learning model, e.g., the result of a classification, regression and or another machine learning model. In some embodiments, blockchain structure may be employed to identify the data provider or data server and to track which data server or provider contributed to create or enhance the machine learning models and which server or computer consumed that data and/or models built from the data.

An implementation of the present disclosure may include a data platform which in some embodiments manages data units from one or multiple data providers or servers, and protects data confidentiality and fair distribution of data unit processing results. A data platform may include one or more hardware processors and a memory device coupled to the one or more hardware processors, and may also include a storage device communicatively coupled to the one or more hardware processors. Data units may be stored on the storage device. The data platform may also include a variety of software components such as a user interface, which allow a user to interact with the hardware processors of the data platform, and a plurality of machine learning algorithms and models generated by the machine learning algorithms. In the data platform, in some embodiments, a data unit can be constituted by an actual source data. In some embodiments, a data unit may be a reference to a repository from where that source data can be retrieved. In some embodiments, a data unit is embedded in a smart contract that supports identification, encryption and management of that data unit. The smart contract may also support identification, encryption and management of several other data units in addition to the data unit being considered. The smart contract, for example, specifies rules and penalties, and also a functionality that automatically enforces the obligations as specified in the rules and penalties.

In some embodiments, the data platform may also support the creation or injection of existing machine learning models. For instance, a user interface running on the data platform may allow a user to run a machine learning algorithm to train a machine learning model. The user interface may also provide a utility that allows a user to import or transfer, and store an existing machine learning model to the data platform, for example, so that the model may be run. A machine learning model, for example, may be trained using a machine learning algorithm, for a specific task in a given domain.

In some embodiments, through the use of encryption methods, the data platform feeds the source data into the machine learning models without exposing the data contents to intermediate components of the platform such as staging areas. For instance, the data platform may receive encrypted data of the data units and decrypt the data to use in running a machine learning algorithm for training a machine learning model. The trained model may be provided to an end user, without having to expose the data of the data units. In this way, by feeding data sources into a machine learning model for training and providing only the final, trained model to the user, the original data sources are not exposed to the end user or a computer system that the end user is employing.

In some embodiments, the machine learning training processes involves the extraction of features from the input data that cannot be transformed back into the original input data, and thus the data platform is capable of protecting the confidentiality of the data that can be computationally processed by third parties.

In some embodiments, the data platform understands the data unit smart contracts, and the data platform keeps track of the entities or servers that provide the data units, knowing which data unit adds value to the model, for example, which data units lead to better outcome or other improvements (e.g., speeding up results, reducing use of computational resources).

In some embodiments, the data platform determines valuable data units for a type of machine learning algorithm by feeding different combinations of data units into separate machine learning instances. For instance, each combination of data units produces a different training set. A machine learning instance refers to a machine learning algorithm or architecture set up to build a machine learning model based on a training data set. The data platform in some embodiments evaluates the various training sets against an objective function (such as an expected shape), verifies the correspondence between input data units and outcomes of each machine learning model, and infers which data units provide the best value, for example, to a user of that machine learning model, for example, executed on the data platform.

In some embodiments, when a machine learning model is used in the data platform to analyze (e.g., classify and/or predict) a given input, the data platform is able to fairly distribute the contribution to the machine learning outcome or improvements not only as a function of the data used to create these results (e.g., input data that a user may provide to a trained model to generate an outcome corresponding to the input data, e.g., a picture of a car, in which the user may expect a "car" tag to be output by the trained model), but also according to the data used to build, train or run the model (e.g., training set data used in training the model to let the model learn), for example, considering data volume, quality, and variety.

FIG. 1 is a diagram illustrating an overview of a data platform that supports creation of machine learning models in one embodiment. A data platform may receive data from a plurality of data providers. For instance, the data may be received as a smart contract, which allows a method (and/or system) of the present disclosure in some embodiments to track the source of each piece of data. For example, the method (and/or system) of the present disclosure in some embodiments may create a "chain", beginning with the received contract and may link other "blocks" that include the services that have used data from that data provider. The received data is illustrated on FIG. 1 as a plurality of datasets: input dataset 1 102, input dataset 2 104, input dataset N 106, each of which may be served by a different data provider.

In one aspect, feature vector extraction may be performed at the data platform based on the data provided by the data providers. For instance, data is input to a machine learning algorithm to train a model and the resulting layers of neurons (e.g., which no longer map back to the original raw data) can be used to classify previously unseen data provided by the end-user of that platform. The plurality of input datasets may have different owners, for example, they may be received from different data providers.

Multiple instances 108, 110, 112, 114 of a machine learning algorithm are run or executed to create multiple machine learning models 116, 118, 120, 122. Examples of machine learning algorithms may include, but are not limited to, linear regression, logistic regression, support vector machines (SVM), neural networks such as deep learning networks, for example, convolutional neural networks (CNN), recurrent neural networks (RNN), multi-layer perceptrons, and/or other machine algorithms and/or another artificial intelligence technique. For example, each instance of the machine learning algorithm may be fed a different input dataset or a different combination of input datasets. For example, as shown, the data platform in one embodiment may feed input dataset 1 102 and input dataset 2 104 to a machine learning algorithm instance at 108 to train and generate a machine learning model at 116. For example, the machine learning algorithm instance at 108 may be run with input dataset 1 102 and input dataset 2 as a training set to train and generate the machine learning model at 116. As another example, as shown, the data platform in one embodiment may feed input dataset 1 102, input dataset 2 104 and input dataset N 106 to a machine learning algorithm instance at 110 to train and generate a machine learning model at 118. For example, the machine learning algorithm instance at 110 may be run with input dataset 1 102, input dataset 2 104 and input dataset N 106 as a training set to train and generate the machine learning model at 118. Yet as another example, as shown, the data platform in one embodiment may feed input dataset 1 102 and input dataset N 106 to a machine learning algorithm instance at 112 to train and generate a machine learning model at 120. For example, the machine learning algorithm instance at 112 may be run with input dataset 1 102 and input dataset N 106 as a training set to train and generate the machine learning model at 120. Still yet as another example, as shown, the data platform in one embodiment may feed input dataset 2 104 and input dataset N 106 to a machine learning algorithm instance at 114 to train and generate a machine learning model at 122. For example, the machine learning algorithm instance at 114 may be run with input dataset 2 104 and input dataset N 106 as a training set to train and generate the machine learning model at 122.

Because the machine learning models 116, 118, 120, 122 are trained based on different data, the generated models may operate with different parameters, and thus may produce different outcomes. An objective function 124 may be run on the results produced by the machine learning models 116, 118, 120 and 122 to determine which model produced better or best outcome. For example, the machine learning models at 116, 118, 120, 122 may be run with a test input data and the results from the runs may be compared with what should be the outcome to determine the accuracy of the models. Data quality assessment 126, for example, may run an objective function 124 on the result of the model at 116. Data quality assessment 128, for example, may run an objective function 124 on the result of the model at 118. Data quality assessment 130, for example, may run an objective function 124 on the result of the model at 120. Data quality assessment 132, for example, may run an objective function 124 on the result of the model at 122. The data quality assessment results at 126, 128, 130 and 132 are compared to determine which model produced the best outcome. A model 134 (also referred to as "best" model) may be thus selected that produced the best outcome out of the runs. In an embodiment, quality information about a dataset may be generated based on how accurately each of the models that used that dataset produced its outcome. For instance, datasets may be ranked based on the data quality assessments 126, 128, 130, 132, for example, as shown at 136. For instance, at 136, information such as the percentage of the data set used to train the chosen machine learning model and the inferred quality of that data may be generated. For instance, Dataset 2 is shown to account for only 15% of the data used to train the machine learning model, yet the quality of the output produced by the services (138, 140, 142) could be more positively affected by that dataset (whose quality is ranked as 9) than by Dataset 1, which provided 42% of the data used to train the model but with a quality ranked as 6. Such variations in quality can be related, for instance, to the spatial resolution of a dataset, or to the number of bits used to represent a piece of information.

A model or models determined to be the best 134 (e.g., those providing best outcomes out of the runs) may be used by a service (e.g., 138, 140, 142) to classify new data provided by the end user. In some embodiments, a data platform of the present disclosure may provide a plurality of machine learning models (e.g., 116, 118, 120, 122), for example, stored in a memory or storage device associated with the data platform. For instance, the data platform may provide a number of services (e.g., via training and running corresponding machine learning models) such as services to classify minerals in a picture (e.g.: silver, gold, copper, pyrite, iron, magnetite), services to determine the maturity of a crop given a satellite image, and/or other services. For example, each service may use a corresponding machine learning model provided by a platform. In some embodiments, the user is not exposed to a machine learning model, but to a service interface corresponding to a machine learning model. For instance, access to a machine learning model may be provided to a user via a service interface.

Figure 2:
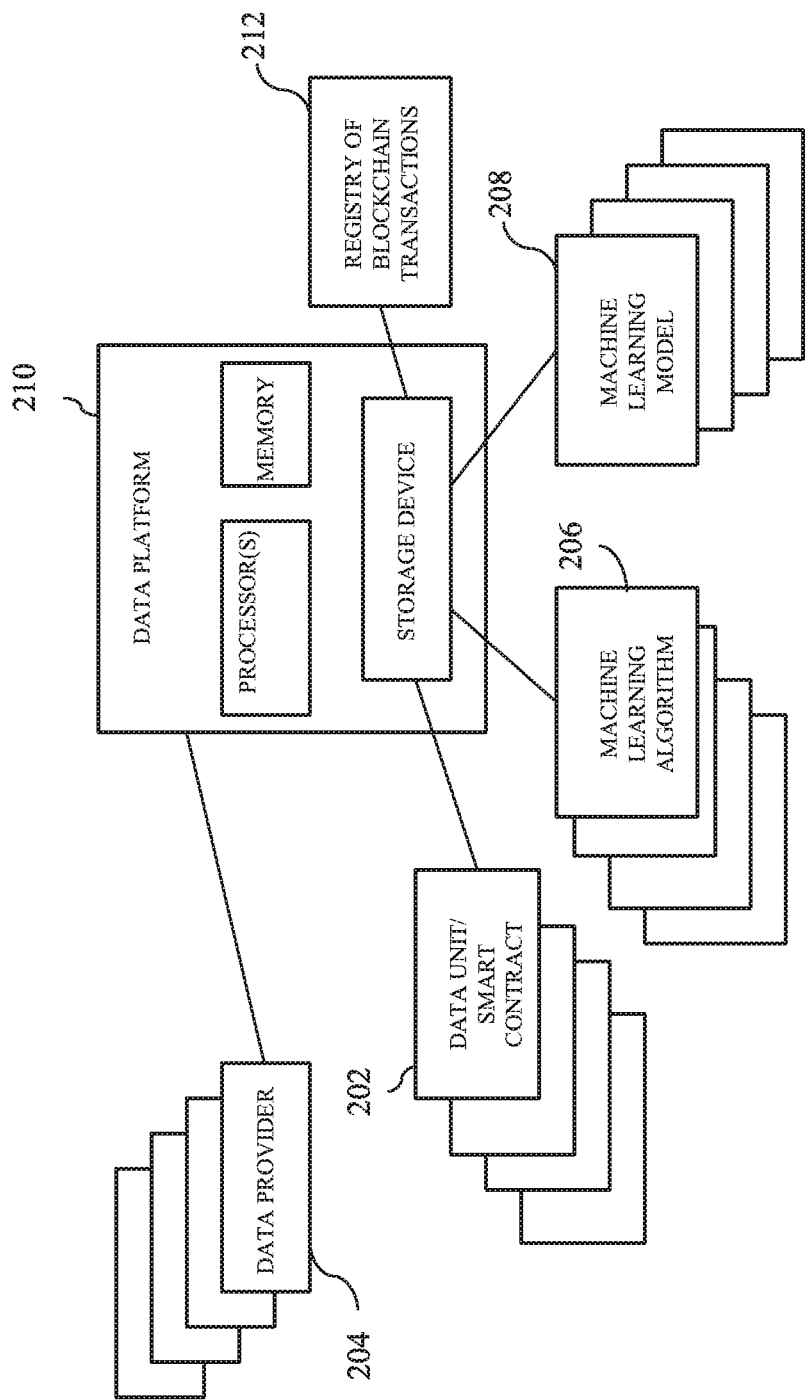
FIG. 2 is a diagram illustrating components of a system in one embodiment.

FIG. 2 is a diagram illustrating components of a system in one embodiment. A data unit 202 describes an input data embedded in a smart contract. There may be a plurality of data units 202. A data unit 202 may be received from a data provider 204 and stored in a memory device or storage device, for example, coupled with a data platform 210.

A data provider 204 owns one or more of a plurality of data sets such as text files, photos, health information, or enterprise-related data such as seismic waves and subsets of a relational database, and/or others, which are offered to a data platform 210 through one or more data units 202.

Machine learning algorithms 206 are used to generate machine learning models 208. There may be new or existing machine learning models. A machine learning algorithm, for example, trains a machine learning model, for example, based on a data set contained or referenced in a data unit 202. A machine learning model trained by running a machine learning algorithm or technique may include parameters or weights which are generated during the training phase. A machine learning model takes data units as input (e.g., input feature vectors) in order to produce an outcome such as a prediction, classification, and/or another outcome. These models are made available on a data platform 210, for example. In some embodiments, the data platform also keeps a registry of blockchain transactions 212 that identify the input data sets used to train each model and the corresponding data providers.[

A data platform 210 may include one or more hardware processors, memory devices and storage devices. The data platform may store the machine learning algorithms 206 and models 208. The data platform 210 allows a user to instantiate a trained machine learning model 208, for example to generate an output such as classification result or prediction result from the input data provided by the user. A user refers to an end user of the data platform.

In some embodiments, a data platform 210 allows a data provider 204 to enlist or register their data sets so that the data platform 210 knows about the data sets and which provider provided which data set. The information enlisted or registered with the data platform 210 may contain the type of data, its spatial resolution, acquisition date(s), geographical location, software or algorithms or types of algorithms needed to parse the data, as example. Other information may be included. The information may be stored, for example, as a catalog or registry 212 on a storage device coupled with the data platform 210 and managed by the data platform 210.

In some embodiments, the data platform 210 may host a plurality of machine learning algorithms 206 and models 208. One or more of the models 208 may have been generated by one or more of the plurality of machine learning algorithms 206 hosted on the data platform 210. In another aspect, one or more of the models 208 may be existing models generated from another machine and imported into the data platform 210.

Machine learning algorithms 206 may be stored or hosted on the data platform 210. Each algorithm may depend on a different set of input data, which can be discovered by the data platform 210 through investigation of its catalog. There may be many different data providers 204 holding data of potential interest to train a model by a machine learning algorithm.

A user may log into the data platform 210 and choose a machine learning algorithm to run. A machine learning algorithm may train a model to produce a specific outcome based on specific input data or feature vector, for example, for analytics services, crop production predictions, high-resolution weather forecasts, or another specific purpose. For instance, each machine learning algorithm may train a model having architecture or structure associated with the machine learning algorithm based on a set of training data. Responsive to a machine learning algorithm being selected, the data platform 210 may select a set of data providers 204. For instance, the data platform 210 may select data providers that provide the type of data used by the selected machine learning algorithm. For example, the data platform 210 may determine or select a data provider, for example, by retrieving the information in the catalog or registry, which specifies data providers, associated type of data offered by the data providers, and machine learning algorithms or types of machine learning algorithms that can use the data offered by the data providers.

In some embodiments, a piece of input data to be provided by a given data provider 204 is embedded in a smart contract that includes information such as the data sets requested, by whom, when, and which service (machine learning algorithm) offered by the data platform would consume the data. A data unit 202, for example, includes the smart contract. For example, the data unit may hold a reference to the input data (e.g., a uniform resource identifier (URI), credentials, and cryptography details needed to retrieve the data) and/or hold the actual encrypted data blocks.

The data platform 210 may retrieve or receive the data unit (and, for example, the data blocks) 202 from the selected set of data providers 204. In the case the data unit holds the actual encrypted data blocks, the data platform 210 may decrypt the data blocks, for example, based on the cryptography details, and use the data blocks in running a machine learning algorithm to train a model. In one aspect, the data platform 210 may also receive the data blocks via the URI or another locator identifier specified in the data blocks.

In some embodiments, the data platform 210 may determine the value of a data unit. For instance, the data platform 210 may test various configurations by instantiating separate machine learning algorithms and training associated machine learning models with different combinations of data units. In some embodiments, multiple data units can be used to train a model. As an example, the data platform 210 may use multiple data units associated with satellite scenes covering an area from Data Provider A to train a model, and discover that training a model with those multiple data units does not lead to a closer match with an objective function. A cause for a less accurate trained model, for example, may be that the satellite scenes were covered by clouds or that they had a very coarse resolution that was not good enough to capture details needed by a service.

For example, a data unit's data blocks may be used as a training set to train a model of a given machine learning algorithm. Multiple models may be trained based on different data unit's data blocks. The trained models may be run with input data and the outcomes or output data produced by the trained models may be verified against the ground-truth data (or what the actual outcome associated with the input data should be). In this way, the data platform 210 may infer which data units provide the best value for a given service. For example, a selection of data units relating to coarse-resolution satellite scenes may have been selected to train a model used by a service that computes statistics on deforestation. On the other hand, that same set of data units may provide a lower contribution to (and thus be absent from) a service that classifies the health of crops based on their leaves using aerial pictures.

In some embodiments, the information regarding the determined value of each data unit may be appended to the associated smart contract for future reference.

The model configuration (e.g., the trained model determined to be most accurate for a given domain or service) determined to be "best", for example, may be provided, for example, as a service to the user. For instance, a model that produces more accurate outcome for a particular service, out of all other models may be selected. In some embodiments, a model that produces highest accuracy in its outcome among other models may be determined to be a "best" model. In some embodiments, a model that produces an outcome meeting threshold accuracy may be determined as a candidate "best" model.

Records of contracts may be added to a blockchain. That blockchain may be distributed over several nodes belonging to the data platform. Nodes refer to computers or computer servers, which may be part of the data platform. In some embodiments, the data platform thus may include one or more nodes. A data platform configured with multiple nodes, for instance, increases the speed of the processing of services provided in the data platform. In some embodiments, the blockchain is used by the nodes of the data platform, and are not exposed externally. Through the records on that chain it is possible to have a broad picture of all the data requested by a given user and determine the value provided by data providers, for example, according to how many data units those data providers provided. The amount of payback to the providers may also be determined based on the value. The contents of a contract are immutable once stored in the blockchain. In addition to the parties and the amounts involved in the contract agreement, the contract may include programming routines that are executed on the data platform to exchange goods and for accounting purposes.

An example of a contract is shown below. In the below example contract, dataset.price represents how much a data unit is worth to a given service. For instance, the price may be determined based on the value of the dataset.

```
CONTRACT {
    coinBalance = map( )
    contracts = chain( )
    function RequestData(consumer, host, dataset) {
        if coinBalance[consumer] >= dataset.price {
            coinBalance[consumer]   =   coinBalance[consumer]   –
dataset.price
```

-continued

```
    coinBalance[host] = coinBalance[host] + dataset.price
    contracts.append(consumer, host, dataset)
    LogEvent(consumer, host, dataset)
    }
   }
}
```

As an example, the above contract also may include a data unit attribute, such as 'dataset.unit', for specifying the data unit (or a reference of data unit) embedded in the contract. A contract, for example, as shown above, may be encoded in a blockchain. In the example introduced by this contract, the data platform 210 may have a list of users, each of which with a virtual wallet. That wallet may determine how much the user needs to pay and how much has been already paid for the use of the services of that platform.

For example, a data platform may include nodes or servers that participate in a blockchain network, for example, in a decentralized peer-to-peer (P2P) network of nodes. In a blockchain network, all nodes in the network receive the smart contract as a block and verify that block added to the blockchain, for example, using signature information provided in the block. The nodes in the network verifying and agreeing to the verification, in one aspect, ensures that the block has not been tempered with and may guarantee the security aspect of storing data blocks from various data providers in the network. The blockchain technology is used by the data platform 210 as a way to record which data units from which data providers have actually been chosen to train the machine learning models. In some aspects, the quality of the data unit dictates the percentage of the service fees that is to be distributed back to the data provider, and having a chain of records that cannot be tampered allows the data platform to perform or function in a secure manner.

Figure 3:
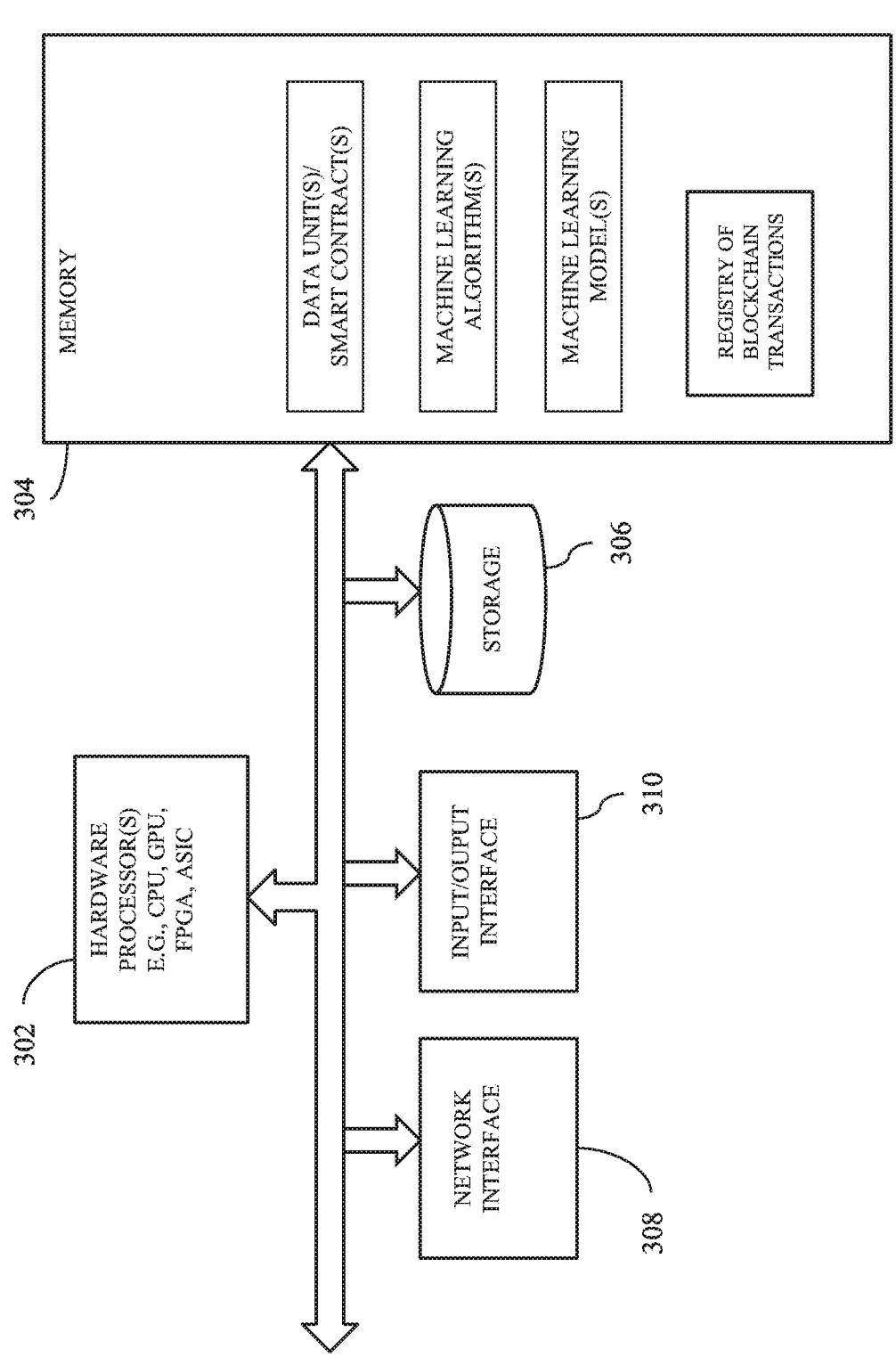
FIG. 3 shows components of a data platform in one embodiment.

FIG. 3 shows components of a data platform, for example, shown at 210 in FIG. 2, in one embodiment. A circuit or circuitry may include one or more hardware processors 302 such as a central processing unit (CPU), a graphic process unit (GPU), and/or a Field Programmable Gate Array (FPGA), an application specific integrated circuit (ASIC), and/or another processor, may be coupled with a memory device 304, and may function to manage data used by machine learning algorithms and models, for example, protect the data from being exposed unnecessarily outside of the data platform, and determine the values of the data received from different data providers. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 304 may, for example, store instructions and/or data for functioning of the one or more hardware processors 302, and may include an operating system and other program of instructions and/or data, and may include a user interface or a graphical user interface for computer-human interaction. The one or more hardware processors 302 may receive a plurality of datasets. A dataset for example, is associated with a data provider. For example, the dataset may be received as a data unit embedded in a contract (e.g., of a blockchain). The data unit or the contract may include information such as the owner (or provider of the dataset), and may include other information. The data unit may include reference to the dataset (e.g., a URI), and cryptography details needed to retrieve the data. In another aspect, the data unit may include actual encrypted dataset. One or more hardware processors 302 may run multiple instances of a machine learning algorithm, for example, loaded onto a memory device 304 and create corresponding multiple machine learning models trained for a specific task in a given domain by the machine learning algorithm. Each of the multiple instances may use a different subset of the plurality of datasets in training the corresponding machine learning model. The trained models may be stored on a memory device 304.

One or more hardware processors 302 may run the multiple machine learning models with input data and the multiple machine learning models produce corresponding multiple outcomes. One or more hardware processors 302 may determine a machine learning model (e.g., "best" machine learning model) from the multiple machine learning models based on comparing each of the multiple outcomes with ground-truth output. The one or more hardware processors 302 may create a smart contract which may include the value, encryption code, and the different subset of the plurality of datasets. The encryption code may include a hash of the smart contract.

One or more hardware processors 302 may record, for example, add or insert the smart contract in a blockchain. One or more hardware processors 302 may also provide the "best" machine learning model, for example, as a service to a user. For instance, a user may be provided with a service interface for running the model.

In one aspect, programming instructions associated with the machine learning algorithms and the trained machine learning models may be stored in a storage device 306. The storage device 306 may also hold or store the data units, for example, received via a network interface 308 from a remote device. The dataset held or referenced in the data units may be loaded onto the memory 304 for use in training the machine learning models. The trained models may be loaded on the memory 304, for example, for execution by one or more hardware processors 302. The one or more hardware processors 302 may be coupled with interface devices such as a network interface 308 for communicating with remote systems, for example, via a network, and an input/output interface 310 for communicating with input and/or output devices such as a keyboard, mouse, display, and/or others.

A data platform in one aspect manages data used by machine learning models and may be supported by blockchain techniques. The data platform may calculate or compute the value or how much each provided data source is worth, create smart contracts for each provided data source to compose data units, and manage encapsulation and decapsulation of data source in smart contracts to protect and deliver data source to machine learning models.

Figure 4:
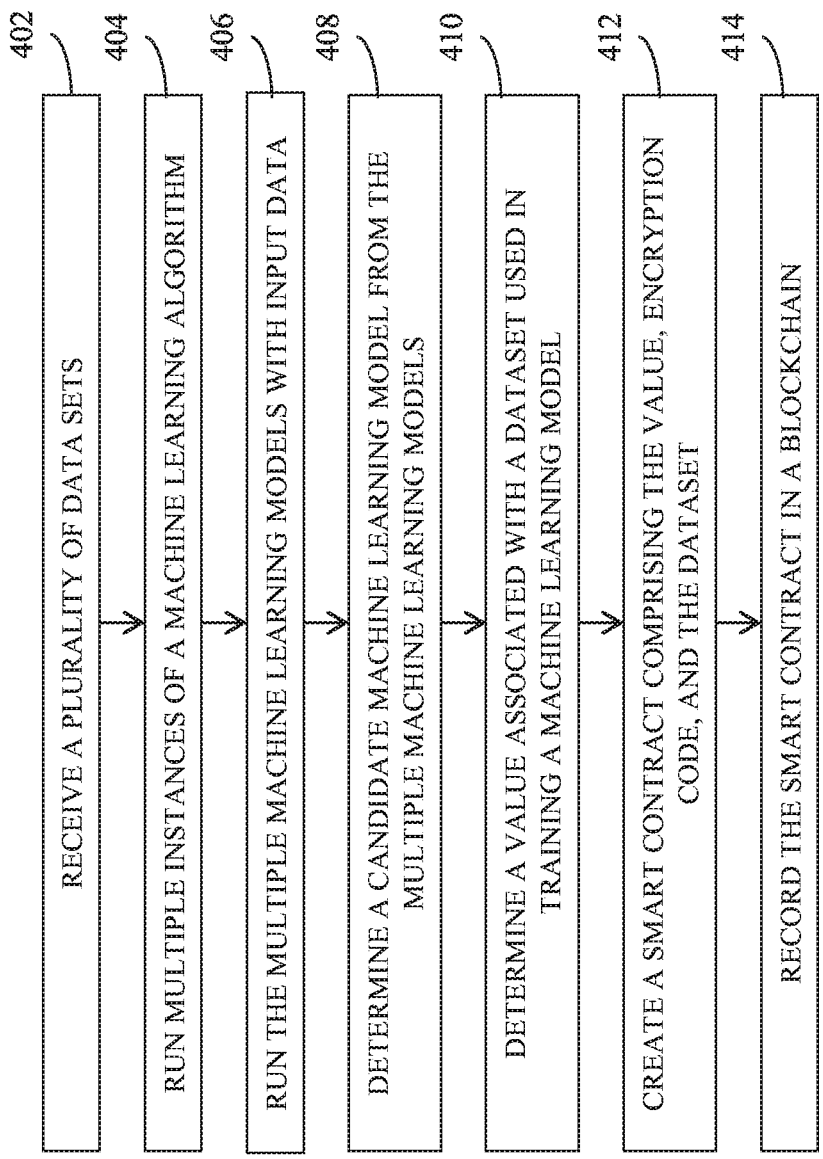
FIG. 4 is a flow diagram illustrating a method according to the present disclosure in one embodiment.

FIG. 4 is a flow diagram illustrating a method according to the present disclosure in one embodiment. The method may be executed by at least one hardware processor, for example, coupled with a memory device and a communication interface. At 402, a plurality of datasets is received. A dataset in the plurality of datasets may be associated with a data provider. At 404, multiple instances of a machine learning algorithm are run to create corresponding multiple machine learning models. The machine learning models, for example, may be trained for a specific task in a given domain. Each of the multiple instances may use a different subset of the plurality of datasets in training the corresponding machine learning model.

At 406, the multiple machine learning models are run with input data, wherein the multiple machine learning models produce multiple outcomes respectively. For instance, the same input data may be used to run the multiple machine learning models. Each of the multiple machine learning models produces an outcome or output, such as a classification, prediction, or another output.

At 408, a machine learning model, which produced "best" outcome, for example, for a given service or domain, may be determined from the multiple machine learning models based on comparing each of the multiple outcomes with ground-truth output. The ground-truth output, for example, may be the true or actual output associated with the input data. For instance, the closer a combination gets to the ground-truth output, the higher the score (or quality) of the datasets involved in the training.

At 410, a value associated with the different subset of the plurality of datasets is determined based on the comparison of each of the multiple outcomes with ground-truth output. In some embodiments, the value can be determined, for instance, as a function of the price paid to run the service and the quality of the datasets as a weighted average.

At 412, a smart contract comprising the value, encryption code, and the different subset of the plurality of datasets may be created.

At 414, the smart contract may be in a blockchain. For example, the smart contract is added as a block in the blockchain that is managed by the data platform. In some embodiments, the blockchain is used by the data platform and is not exposed to the end users of the service.

Figure 5:
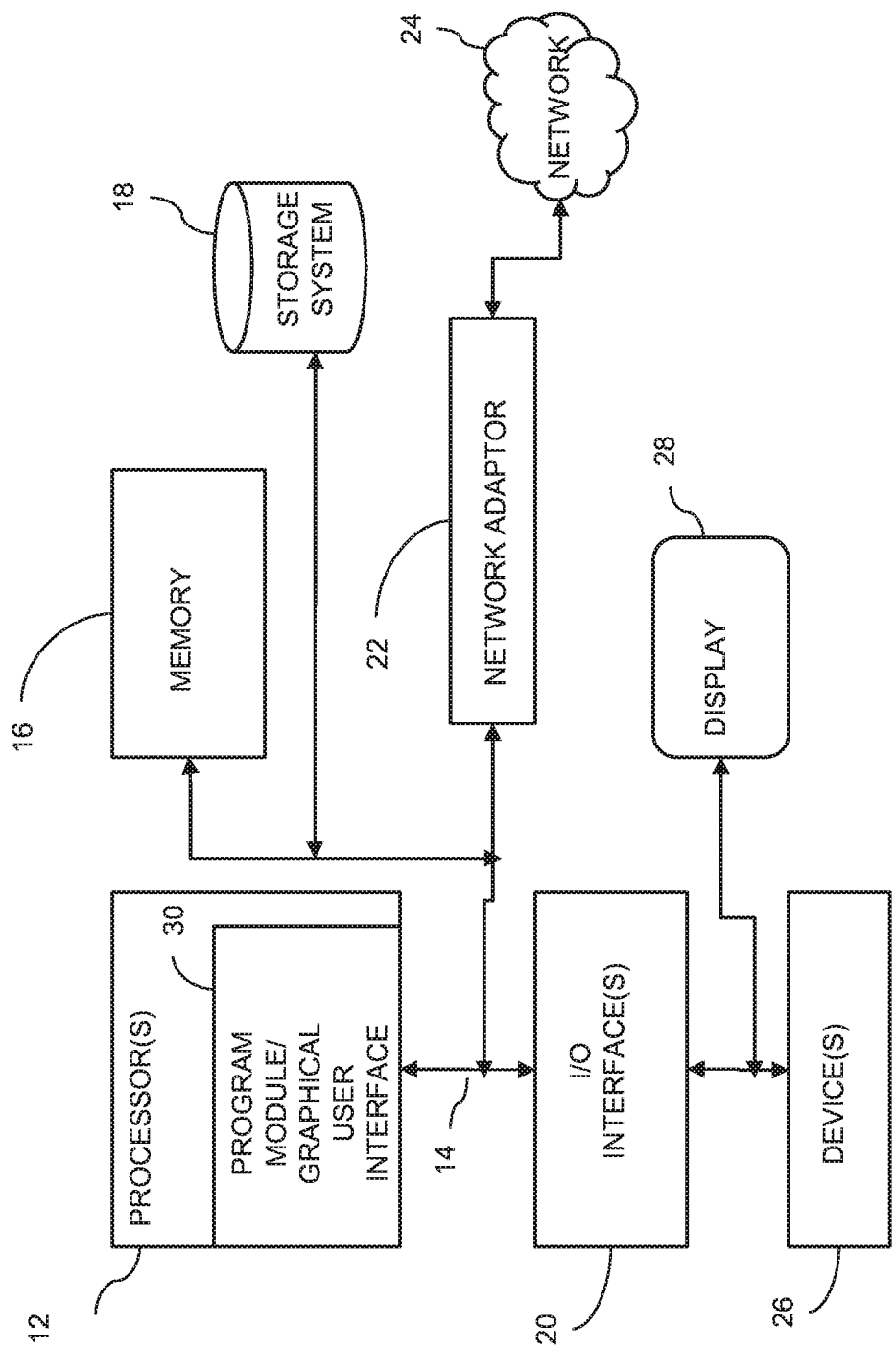
FIG. 5 illustrates a schematic of an example computer or processing system that may implement a system according to the present disclosure in one embodiment.

FIG. 5 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method performed by at least one hardware processor, comprising:
    receiving a plurality of datasets, a dataset in the plurality of datasets associated with a data provider;
    running multiple instances of a machine learning algorithm to create corresponding multiple machine learning models trained for a specific task in a given domain, each of the multiple instances using a different subset of the plurality of datasets in training the corresponding machine learning model;
    running the multiple machine learning models with input data, wherein the multiple machine learning models produce corresponding multiple outcomes;
    determining a candidate machine learning model from the multiple machine learning models based on comparing each of the multiple outcomes with ground-truth output;
    determining a value associated with the different subset of the plurality of datasets used as a training set based on the comparing of each of the multiple outcomes with ground-truth output, the value corresponding to quality associated with the different subset of the plurality of datasets, the quality associated with the different subset of the plurality of datasets being determined based on contribution of the different subset of the plurality of datasets to how accurately a machine learning model that is trained using the different subset of the plurality of datasets, produced an outcome;
    creating a smart contract comprising the value and the different subset of the plurality of datasets, the smart contract protecting security of training data used by the machine learning algorithm; and
    recording the smart contract in a blockchain,
    wherein the machine learning algorithm is selected by a user via a user interface coupled with the at least one hardware processor, the value further provided with a percentage of different data sets that make up the different subset and the data providers associated with the different data sets.

2. The method of claim 1, wherein an access to the candidate machine learning model is provided via a service interface.

3. The method of claim 1, wherein the dataset is received as a data unit embedded in a contract in the blockchain.

4. The method of claim 1, wherein the smart contract embeds the different subset of the plurality of datasets as a reference location with cryptographic information for accessing the reference location to retrieve actual data of the datasets.

5. The method of claim 1, wherein the smart contract embeds the different subset of the plurality of datasets as actual data that is encrypted.

6. The method of claim 1, wherein the smart contract further comprises an encryption code comprising a hash value of the smart contract.

7. A computer readable storage medium storing a program of instructions executable by a machine to perform a method comprising:
    receiving a plurality of datasets, a dataset in the plurality of datasets associated with a data provider;
    running multiple instances of a machine learning algorithm to create corresponding multiple machine learning models trained for a specific task in a given domain, each of the multiple instances using a different subset of the plurality of datasets in training the corresponding machine learning model;
    running the multiple machine learning models with input data, wherein the multiple machine learning models produce corresponding multiple outcomes;
    determining a candidate machine learning model from the multiple machine learning models based on comparing each of the multiple outcomes with ground-truth output;
    determining a value associated with the different subset of the plurality of datasets used as a training set based on the comparing of each of the multiple outcomes with ground-truth output, the value corresponding to quality associated with the different subset of the plurality of dataset, the quality associated with the different subset of the plurality of datasets being determined based on contribution of the different subset of the plurality of datasets to how accurately a machine learning model that is trained using the different subset of the plurality of datasets produced an outcome;
    creating a smart contract comprising the value and the different subset of the plurality of datasets, the smart contract protecting security of training data used by the machine learning algorithm; and
    recording the smart contract in a blockchain,
    wherein the machine learning algorithm is selected by a user via a user interface coupled with the at least one hardware processor, the value further provided with a percentage of different data sets that make up the different subset and the data providers associated with the different data sets.

8. The computer readable storage medium of claim 7, wherein an access to the candidate machine learning model is provided as a service interface.

9. The computer readable storage medium of claim 7, wherein the dataset is received as a data unit embedded in a contract in the blockchain.

10. The computer readable storage medium of claim 7, wherein the smart contract embeds the different subset of the plurality of datasets as a reference location with cryptographic information for accessing the reference location to retrieve actual data of the datasets.

11. The computer readable storage medium of claim 7, wherein the smart contract embeds the different subset of the plurality of datasets as actual data that is encrypted.

12. The computer readable storage medium of claim 7, wherein the smart contract further comprises an encryption code comprising a hash value of the smart contract.

13. A system comprising:
    at least one hardware processor coupled with a memory device;
    the at least one hardware processor operable to at least:
        receive a plurality of datasets, a dataset in the plurality of datasets associated with a data provider;
        run multiple instances of a machine learning algorithm to create corresponding multiple machine learning models trained for a specific task in a given domain, each of the multiple instances using a different subset of the plurality of datasets in training the corresponding machine learning model;
run the multiple machine learning models with input data, wherein the multiple machine learning models produce corresponding multiple outcomes;
determine a candidate machine learning model from the multiple machine learning models based on comparing each of the multiple outcomes with ground-truth output;
determine a value associated with the different subset of the plurality of datasets used as a training set based on the comparing of each of the multiple outcomes with ground-truth output, the value corresponding to quality associated with the different subset of the plurality of dataset, the quality associated with the different subset of the plurality of datasets being determined based on contribution of the different subset of the plurality of datasets to how accurately a machine learning model that is trained using the different subset of the plurality of datasets produced an outcome;
create a smart contract comprising the value and the different subset of the plurality of datasets, the smart contract protecting security of training data used by the machine learning algorithm; and
record the smart contract in a blockchain,
wherein the machine learning algorithm is selected by a user via a user interface coupled with the at least one hardware processor, the value further provided with a percentage of different data sets that make up the different subset and the data providers associated with the different data sets.

14. The system of claim 13, wherein an access to the candidate machine learning model is provided as a service interface.

15. The system of claim 13, wherein the dataset is received as a data unit embedded in a contract in the blockchain.

16. The system of claim 13, wherein the smart contract embeds the different subset of the plurality of datasets as a reference location with cryptographic information for accessing the reference location to retrieve actual data of the datasets.

17. The system of claim 13, wherein the smart contract embeds the different subset of the plurality of datasets as actual data that is encrypted.

* * * * *